B. B. HILL.
DETACHABLE WHEEL.
APPLICATION FILED NOV. 11, 1910.

1,002,151.

Patented Aug. 29, 1911.

Witnesses
M. E. Gray
J. M. Meyer

Inventor
B. B. Hill

UNITED STATES PATENT OFFICE.

BARTON BERKLEY HILL, OF STOKE NEWINGTON, LONDON, ENGLAND.

DETACHABLE WHEEL.

1,002,151.  Specification of Letters Patent.  Patented Aug. 29, 1911.

Application filed November 11, 1910. Serial No. 591,807.

*To all whom it may concern:*

Be it known that I, BARTON BERKLEY HILL, a citizen of the United States of America, residing at 29ª Princess May road, Stoke Newington, London, England, have invented certain new and useful Improvements in Detachable Wheels, of which the following is a specification.

This invention relates to detachable wheels for motor propelled and other vehicles and particularly to the type of wheel, the hub of which is provided with a number of holes to receive pins carried by a flanged shell, which is free to rotate on the axle but is restrained from moving axially thereon, the hub being locked on said pins by suitable means.

The object of the present invention is to facilitate the locking of the hub on the pins and in such a manner that after the hub is slid onto the pins a mere partial rotary movement given to a member thereon by means of a spanner or other tool, will suffice to lock the hub on all the pins simultaneously.

Another object of the invention is to cause an automatic tightening or loosening of the hub on the pins according to the direction in which the aforesaid rotary movement is applied.

With the above objects in view the invention comprises a shell having pins, a wheel hub having holes to receive said pins, a locking member carried by the wheel hub, but so as to be free to rotate thereon, said member having means which, when the said member is partially rotated, co-act with means on the aforesaid pins to lock or unlock the hub on the pins and to draw on or back off the hub according to the direction in which said member is rotated.

The invention also comprises a lock for the locking member, and other details hereinafter referred to.

Figure 1:
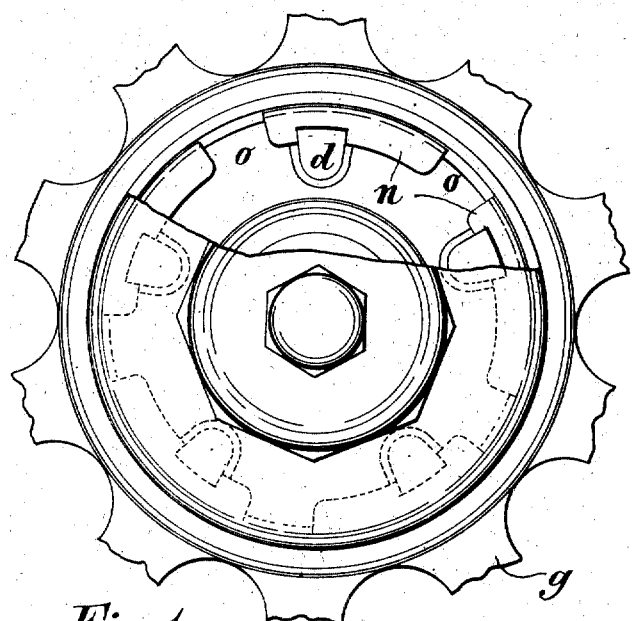
Figure 2:
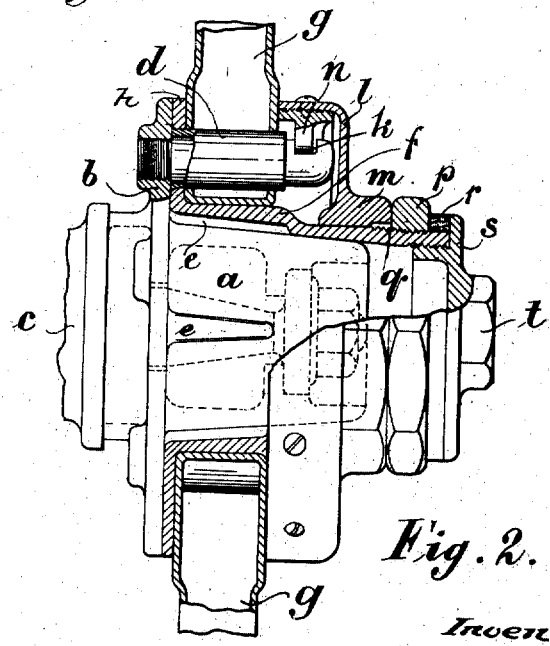

In the accompanying drawings, Figure 1 is a side view of one form of detachable wheel hub according to the invention, part of it being broken away to show some of the locking devices for the pins. Fig. 2 is a front sectional elevation corresponding thereto.

In the form of the invention illustrated, a shell $a$, is provided with a flange $b$, and is mounted on the end of the axle $c$, in any usual manner so that it is free to rotate thereon, but is restrained from moving axially in relation thereto. The mode of mounting the shell $a$, on the axle forms no part of the present invention. The flange $b$, is provided with a number of pins $d$, and the body of the shell is provided with feathers or keys $e$, for entering corresponding recesses in the wheel hub $f$. The hub $f$, carries the spokes $g$, in any usual manner and the flange $h$, of the hub is provided with holes so that the hub can be slid on to the pins $d$. The outer ends of the pins $d$, are slotted as at $k$.

A rotary locking member $l$, provided with a hexagonal sleeve $m$, for receiving a spanner or like tool, is furnished with a number of locking devices in the form of cams $n$, adapted to enter the slots $k$, in the pins $d$, when the rotary locking member $l$, is partially rotated. The cams $n$, are in such number and are so disposed on the member $l$, that when the latter is in one position and the wheel hub is slid on to the pins $d$, the latter pass through the spaces $o$, (Fig. 1) between the cams $n$, a slight rotary movement of the member $l$, resulting in the cams $n$, entering all the slots $k$, simultaneously and thereby locking the hub on the pins. The cams are of such inclination that when they enter the slots $k$, they impart an axial movement to the hub relatively to the shell $a$, tending to tighten the hub thereon. The member $l$, is itself then locked by a lock nut $p$, on the threaded part $q$, of the hub, so as to avoid accidental movement of the member $l$, due to vibration. A rubber washer $r$, is preferably inserted between the lock nut $p$, and the flange $s$, of a cap $t$, which is screwed into the end of the hub.

When the wheel is to be detached, a spanner or other tool is applied to the lock nut $p$, and the hexagonal sleeve $m$, and a slight rotary movement is imparted thereto in the reverse direction to that adopted to lock the hub, whereupon all the cams $n$, leave their slots to release the hub on the pins $d$. This reverse movement of the cams $n$, also results in a slight axial movement of the hub tending to back it off the pins $d$, and loosen it on the shell $a$.

It will thus be understood that by a slight rotary movement of the locking member $l$, in one direction or the other the hub is locked to or released from all the pins $d$, simultaneously, and also drawn on to them or backed off therefrom.

I claim:

1. A detachable wheel comprising a shell having pins, a hub having holes to receive said pins, and a locking member carried by the hub, said locking member rotating on said hub and including cams which coöperate with the ends of said pins when said member is partially rotated relatively to the hub for the purpose of locking the hub on the pins, substantially as hereinbefore set forth.

2. A detachable wheel comprising a shell having pins provided with grooves, a hub having holes to receive said pins, a rotary locking member on the hub adapted to rotate relatively thereto, a plurality of inwardly extending cams on the rotary locking member which engage the grooves in the pins, whereby to simultaneously lock all the pins, and means for fastening the rotary locking member.

3. A detachable wheel comprising a shell having slotted pins, a hub having holes to receive said pins, a locking member carried by the hub and adapted to be rotated relatively thereto, and cams on said member for co-acting with the slots on the aforesaid pins, substantially as hereinbefore set forth.

4. A detachable wheel comprising a shell having a flange, pins projecting from said flange and having slots in their ends, a hub having holes to receive said pins, a rotary locking member carried by the hub and having cams adapted to enter and recede from the slots in the said pins when said locking member is partially rotated relatively to the hub, and a lock nut on the hub for said rotary locking member, substantially as and for the purpose hereinbefore described.

5. A detachable wheel comprising a shell having pins, a hub having holes to receive said pins, a rotary locking member on the hub adapted to rotate relatively thereto, said member having means for co-acting with the said pins to lock the hub thereto, and having a hexagonal extension substantially as and for the purpose hereinbefore set forth.

In testimony whereof I affix my signature in the presence of two witnesses.

BARTON BERKLEY HILL.

Witnesses:
A. W. MATHYS,
H. W. COX.